United States Patent [19]
Teder

[11] Patent Number: 6,091,065
[45] Date of Patent: Jul. 18, 2000

[54] MOISTURE SENSOR WITH DIGITAL SIGNAL PROCESSING FILTERING

[75] Inventor: Rein S. Teder, Bloomington, Minn.

[73] Assignee: Libbey-Owens-Ford Co., Toledo, Ohio

[21] Appl. No.: 09/224,643

[22] Filed: Dec. 31, 1998

[51] Int. Cl.⁷ .................................................. G02B 6/42
[52] U.S. Cl. ..................... 250/227.25; 250/573; 318/483
[58] Field of Search ............................. 250/227.25, 573, 250/574; 318/483, DIG. 2; 340/602, 603, 604

[56] References Cited

U.S. PATENT DOCUMENTS

| | | |
|---|---|---|
| 4,355,271 | 10/1982 | Noack . |
| 4,481,450 | 11/1984 | Watanabe et al. . |
| 4,620,141 | 10/1986 | McCumber et al. . |
| 5,059,877 | 10/1991 | Teder . |
| 5,225,669 | 7/1993 | Hasch et al. . |
| 5,239,244 | 8/1993 | Teder . |
| 5,414,257 | 5/1995 | Stanton ............................. 250/227.25 |
| 5,436,541 | 7/1995 | Mangler et al. . |
| 5,568,027 | 10/1996 | Teder . |

Primary Examiner—Que T. Le
Attorney, Agent, or Firm—Marshall & Melhorn

[57] ABSTRACT

A moisture sensor for detecting moisture on the surface of a transparent material. The moisture sensor includes one or more emitters for producing emitter signals which are influenced by moisture on the transparent material, and one or more detectors for receiving the emitter signals. The detector produces a detector output signal which is filtered and amplified in a pre-demodulation gain and filtering circuit to remove some of the unwanted signal components including noise from ambient light and EMI. Digital Signal Processing filtering is used after the moisture signal is demodulated to a dc signal to discern small signal changes due to moisture events in the presence of large amounts of the noise created by the pre-demodulation gain circuit. The DSP filtering includes a low pass filter stage and a band pass filter stage implemented by a microcomputer using First In First Out shift registers, summing elements and division elements.

26 Claims, 5 Drawing Sheets

MOISTURE SENSOR WITH DIGITAL SIGNAL PROCESSING FILTERING

BACKGROUND OF THE INVENTION

The present invention relates generally to an optical moisture sensor for detecting moisture on the surface of a transparent material, and more particularly, to a moisture sensor digital signal processing filtering for reducing the effects of unwanted signal components.

The accumulation of moisture on transparent materials, such as glass or Plexiglass, can obstruct a person's view through the material. Motor vehicles have long been equipped with motor-driven windshield wipers for clearing the moisture from the external surface of the windshield, at least within the driver's field of vision, and generally over a larger area so as to enhance one's vision through the windshield.

In most vehicles today, the windshield wiper system includes multi-position or variable speed switches which allow the driver to select a wide, if not an infinitely variable, range of speeds to suit conditions. Wiper controls are manually operated and typically include a delay feature whereby the wipers operate intermittently at selected time delay intervals.

Wiper control systems have recently been developed which include a moisture sensor mounted on one of the vehicle windows to automatically activate the wiper motor when moisture is deposited upon the surface of the window. The wiper control system including the moisture sensor are most typically mounted on the windshield, although the system may be mounted on the rear window or any other glass surface intended to be cleared of moisture. Such wiper control systems free the driver from the inconvenience of frequently adjusting the wiper speed as the driving conditions change.

Wiper control systems have used a number of different technologies to sense the moisture conditions encountered by a vehicle, including conductive, capacitive, piezoelectric, and optical sensors. Optical sensors operate upon the principle that a light beam is diffused or deflected from its normal path by the presence of moisture on the exterior surface of the windshield. The systems which employ optical sensors have the singular advantage that the means of sensing disturbances in an optical path is directly related to the phenomena observed by the driver (i.e., disturbances in the optical path that affords the driver vision). McCumber et al. (U.S. Pat. No. 4,620,141) disclose an optical moisture sensor which triggers a sweep of the wiper blades in response to the presence of water droplets on the exterior surface of a windshield.

In optical moisture sensors, a pulsatile light signal from an emitter is directed into the windshield and reflected back by the outer surface of the windshield and into a detector. The presence of moisture on the surface of the windshield affects the reflection of the pulsatile light signal at the outer surface of the windshield resulting in a reflected signal having a lower amplitude. The detector receives the reflected pulsatile signal and produces a pulsatile output signal which indicates the change in amplitude of the reflected emitter signal. The detector output signal also contains unwanted signals such as those from ambient light, electromagnetic interference, and white noise generated by the detector. These undesirable signal components must be removed before accurate moisture readings can be obtained.

It is known to use filters to remove unwanted signal components from the pulsatile detector signal. Schierbeek et al. in U.S. Pat. No. 4,916,374 show that a photovoltaic cell may be connected to a current to voltage amplifier, a high pass filter, and a further voltage amplifier, and subsequently demodulated using a sample and hold. The filters and amplifiers are of '374 are thus pre-demodulation circuits which act on the pulsatile signal before a demodulator converts it into a dc signal that is affected by sensed moisture. In U.S. Pat. No. 4,956,591, Schierbeek at al. use a high pass filter to remove the DC bias, and amplification located before demodulation.

However, the use of wide band pre-demodulation gain increases the amplitude of broadband unwanted noise especially white noise caused by random recombination of electrons and holes in the photodiodes. Such noise is inherent in the devices. It is desirable to use wideband pre-demodulation gain to increase the signal strength for improved sensitivity to moisture events. Without such gain, the sensor may not respond to the effects of small moisture droplets. Wideband pre-demodulation gain, however, amplifies the unwanted noise along with the desired signal. It is therefore, desirable to remove unwanted noise in the moisture detector signal after demodulation so that the sensor may be able to respond to small droplets of moisture.

SUMMARY OF THE INVENTION

A moisture sensor for detecting moisture on the surface of a transparent material. The moisture sensor includes one or more emitters for producing emitter signals which are influenced by moisture on the transparent material, and one or more detectors for receiving the emitter signals. The detector produces a detector output signal which is filtered and amplified in a pre-demodulation gain and filtering circuit to remove some of the unwanted signal components including noise from ambient light and EMI. A demodulation circuit creates a dc signal for indicating the presence of moisture.

The invention incudes extensive Digital Signal Processing filtering after the moisture signal is demodulated to discern small signal changes due to moisture events in the presence of large amounts of the noise created by the pre-demodulation gain circuit. The DSP filtering includes a low pass filter stage implemented by a microcomputer using an 8 element First In First Out shift register, a summing element and a division element. The output of the filter is an average of the eight prior input values. As a result, white noise in the demodulated moisture signal is attenuated by a factor of eight. The DSP filtering further includes a bandpass filter stage implemented by a microcomputer using 32 element First In First Out shift register, a summing element and a division element. The bandpass filter further reduces the white noise in the signal, as well as reducing the effects of very low frequency disturbances.

BRIEF DESCRIPTION OF THE DRAWINGS

The advantages of the invention will become readily apparent to those skilled in the art from the following detailed description of a preferred embodiment when considered in the light of the accompanying drawings, in which.

DETAILED DESCRIPTION OF THE PREFERRED EMBODIMENTS

It is to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
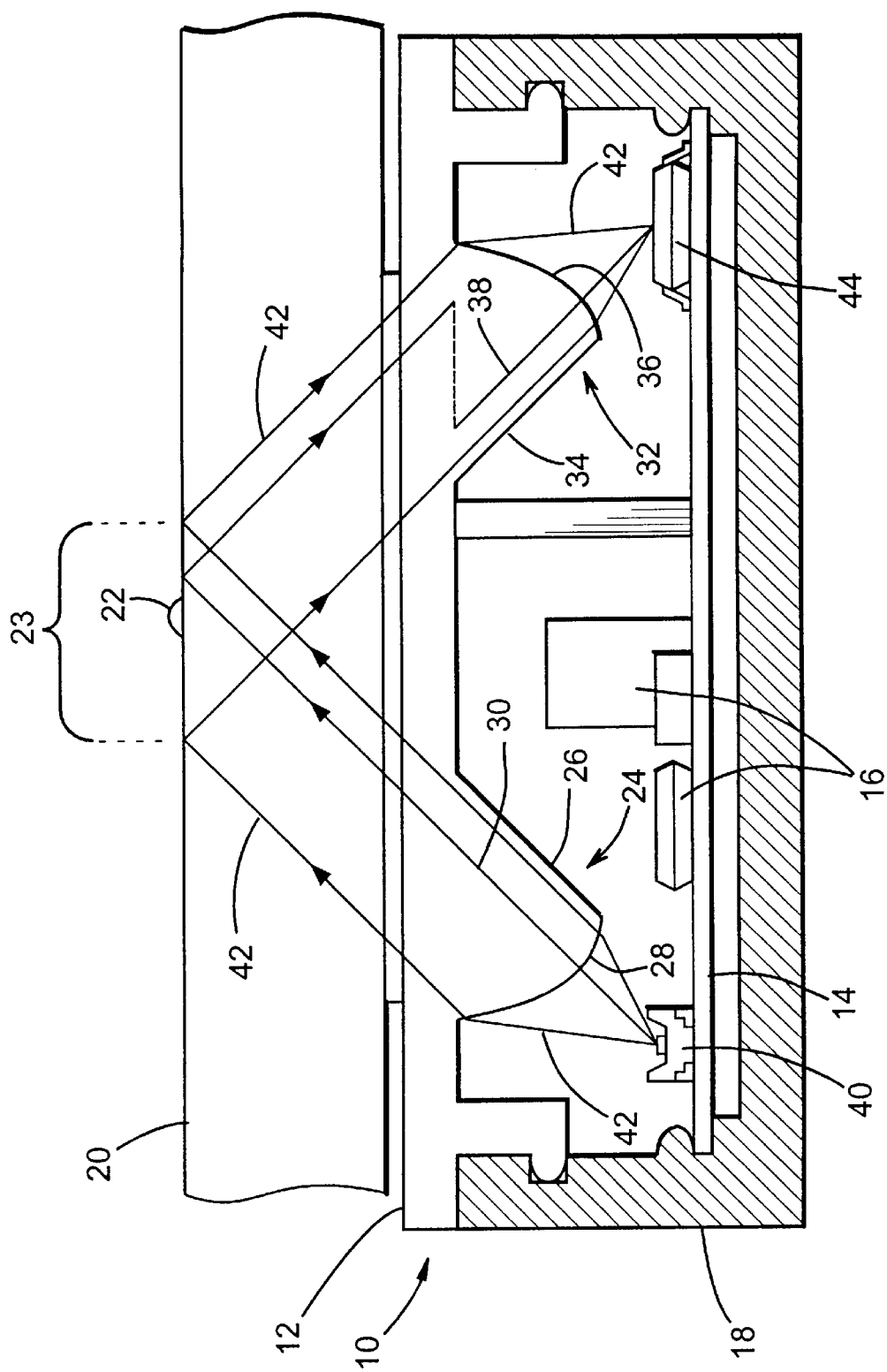
FIG. 1 is a perspective view of a moisture sensor mounted on the inner surface of the windshield in accordance with the invention.

Referring now to FIG. 1, an optoelectronic moisture sensor is shown generally at 10. The moisture sensor includes a coupler 12, a circuit board 14 for mounting electronic components 16, and a sensor housing 18 attachable to the coupler 12 for enclosing the circuit board 14.

The coupler 12 is secured to a first surface of a transparent material 20 for the optical detection of moisture 22 on the oppositely disposed, second surface of the transparent material. The transparent material 20 is preferably glass, such as an automotive windshield or freezer door, although the moisture sensor may be used to detect moisture on plexiglass, plastic or any other transparent material.

The coupler 12 includes a collimator 24 including a collimating body 26 extending from the coupler and a collimating lens 28 disposed adjacent to the collimating body. The collimating lens 28 has an optical axis 30 which extends through the collimating body 26 at a forty-five degree angle with respect to the inner surface of the glass 20. The coupler 12 further includes a focuser 32 having a focusing body 34 extending from the coupler and a focusing lens 36 disposed adjacent to the focusing body. The focusing lens 36 has an optical axis 38 which extends through the focusing body 34 at a forty-five degree angle with respect to the inner surface of the glass 20.

An optoelectonic signal emitter 40 is disposed on the circuit board 14 adjacent the collimator 24 for emitting a signal indicated at 42. The signal emitter 40 is preferably an infrared light-emitting diode, although any suitable signal emitter may be used. The emitted signal 42 is preferably an infrared radiation signal, that is infrared light, although any suitable signal may be used. A detector 44 is disposed on the circuit board 40 adjacent the focuser 32. The detector 44 is preferably a photodiode, although any suitable detector for receiving the emitter signal 42 may be used.

During operation of the moisture sensor, the emitter 40 emits an infrared signal 42 which travels to the collimating lens 28 of the collimator 26. The emitted signal 42 is collimated into a collimated beam which travels along the optical axis 30 and into the glass 20 at a forty-five degree angle with respect to the inner surface of the glass. The collimated signal 42 strikes the outer surface of the glass 20 at a sensing region 23 where the presence of moisture can be detected. The collimated signal 42, or at least a portion of the signal is then reflected back through the glass 20 and into the focusing body 34 at a forty-five degree angle with respect to the glass. The focusing lens 28 focuses the reflected signal 42 onto the detector 44.

If moisture 22 has accumulated on the windshield in the sensing region 23, a portion of the collimated light beam 42 will not be reflected back to the focusing body 34 and the detector 44 will produce a signal representative of the lesser amount of light which is detected. The moisture sensing circuitry 16 receives the detector signal and interprets the change in the signal as the presence of moisture and controls the wipers accordingly.

Additional details concerning the operation of the optical portion of the moisture sensor and the interface with the wiper control system may be obtained from U.S. Pat. Nos. 4,620,141; 5,059,877; 5,239,244; and 5,568,027, and U.S. application No. 08/951,922 filed Oct. 16, 1997, now U.S. Pat. No. 5,898,183. To the extent any such details may be necessary to complete the descriptions and accounts necessary for purposes of the present application, these references are deemed to be incorporated by reference herein. While the moisture sensor described above is an optoelectronic moisture sensor, any suitable moisture sensor may be used in which the emitted signal received by a detector is used for detecting the presence of moisture on the surface of a transparent material.

Figure 2:
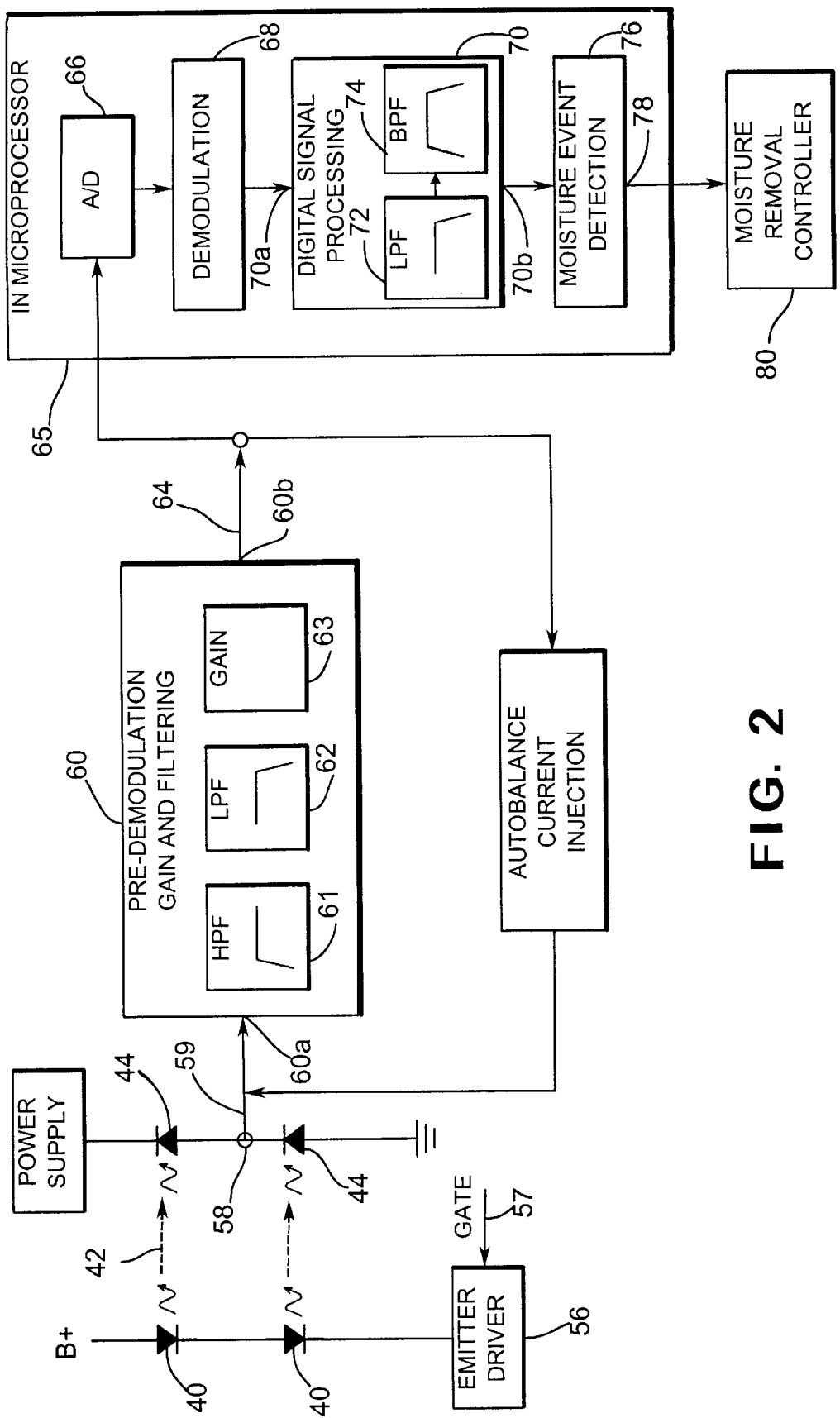
FIG. 2 is a block diagram of the moisture sensor illustrated in FIG. 1 including the pre-demodulation gain and filtering and the post-demodulation digital signal processing filtering in accordance with the invention.

Referring now to FIG. 2, a block diagram of the moisture sensor 10 is illustrated. The preferred embodiment of the moisture sensor includes a pair of emitters 40 communicating with a pair of detectors 44 for detecting moisture as described above. An emitter driver 56 is connected to the emitters 40 for providing power to the emitters in an amount which determines the amplitude or intensity of the emitter signals 42. A periodically repeating gate signal pulse 57 is applied to emitter driver 56 as described below.

The detectors 44 are coupled with the emitters 40 for receiving at least a portion of the emitter signals 42 and respond by producing detector signals (not shown). In the preferred embodiment, each detector 44 is preferably optically coupled for receiving the emitter signal 42 from each emitter 40, in a similar manner as described above, to create four sensing regions 23 on the transparent material. However, any suitable number of emitters 40 and detectors 44 may be used to create any desired number sensing regions 23.

The detectors 44 are connected to a common node 58 where the detector signals are combined to produce a detector output signal 59. In the preferred embodiment, both of the photodiode detectors 44 are connected in a balanced configuration so that the detector signals they produce have opposite amplitudes and tend to cancel when combined to produce the detector output signals 59. The balanced configuration provides some degree of additional sensitivity to moisture and improved dynamic range. The balanced configuration also tends to cancel the effects of the ambient light common in both emitter signals 42, thereby providing some immunity to ambient light. However, the detector output signal 59 still includes some unwanted signal components created by ambient light and electromagnetic interference.

Figure 3:
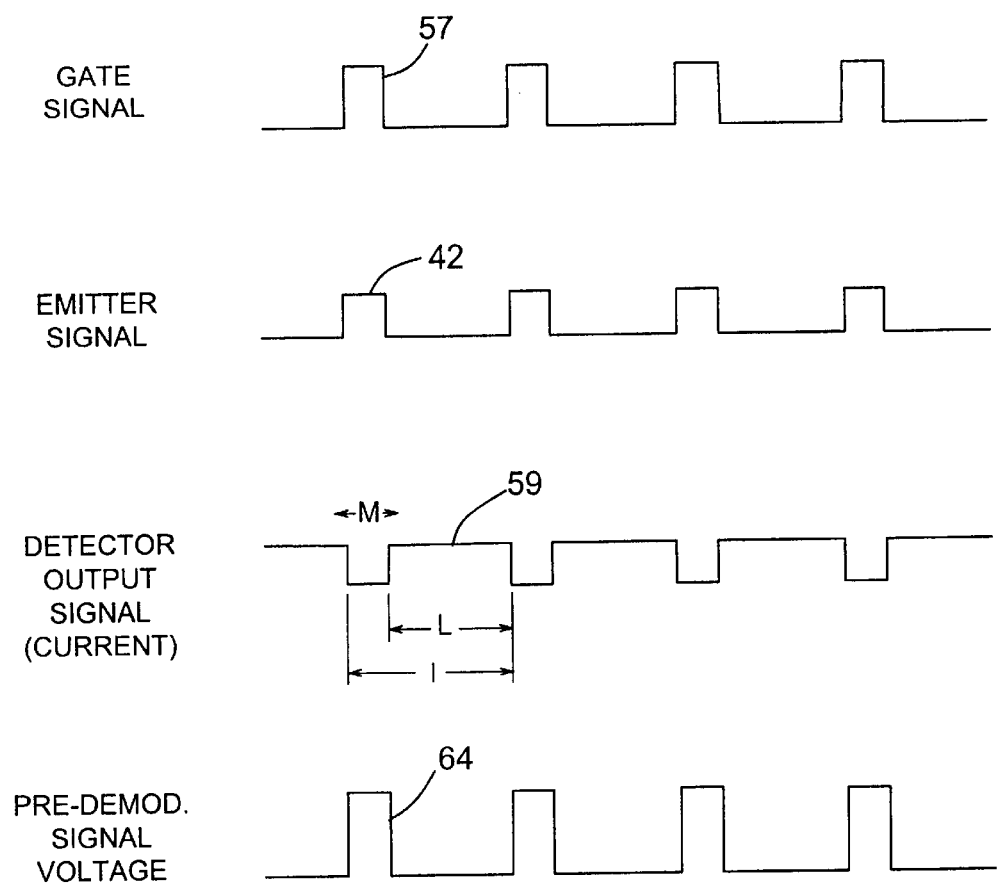
FIG. 3 is a graph illustrating the moisture sensor signals for the moisture sensor illustrated in FIG. 2.

Referring now to FIG. 3, the periodically repeating pulsed gate signal 57 received by the emitter driver 56 is illustrated. The gate signal pulses 57 preferably have a 50-microsecond duration, and are repeated at a frequency of 1200 Hz, although any suitable duration and frequency may used. The emitter driver 56 is preferably a current source which responds to each gate signal pulse 57 by providing a pulse of current to the emitters 40. The emitters 40 respond to each current pulse by producing pulsed emitter signals shown at 42.

The detectors 44 allow current to flow in an amount proportional to the strength of the reflected emitter signals 42 they receive. The detector currents (not shown) are combined at node 58 to produce the detector output signal shown at 59. In the preferred embodiment, the detector output signal 59 is a pulsed current signal comprising a plurality of repeating signal intervals I. Each signal interval I has a duration of approximately 833 microseconds based on the gate signal pulse frequency of 1200 Hz described above, although any suitable duration may be used. Each signal interval I comprises a moisture sensing signal portion M which includes signal information about the reflected emitter signals 42 received by the detectors 44 as well as the effects of ambient light striking the detectors. Each signal interval I also has a light signal portion L when the emitters are not operated which includes the effects of the ambient light. The duration of each moisture sensing signal portion M is preferably 50 microseconds corresponding to the duration of the gate signal pulses 57.

Referring again to FIG. 2, the detector output signal 59 is coupled to the input 60a of a high gain, wide bandwidth pre-demodulation amplifier and filter circuit 60 to remove the undesirable signal components. The pre-demodulation amplifier and filter circuit 60 includes high pass filtering 61 for reducing effects of the ambient light disturbances by rejecting low frequency signal components of the detector output signal 59. The high pass filter 61 is preferably a fifth order filter having a corner frequency of 160 HZ for sharply attenuating the low frequency disturbances while passing most of the moisture sensing portion M of the detector output signal 59. However, any suitable order high pass filter having any suitable corner frequency may be used.

The pre-demodulation amplifier and filter circuit 60 also includes low pass filtering 62 for rejecting high frequency noise such as electromagnetic interference and random recombination of electrons and holes in the photodiodes 44. The low pass filter 62 is preferably a second order filter having a corner frequency of 33 KHZ for attenuating the high frequency disturbances while passing most of the energy present in the detector output signal 59. However, any suitable order low pass filter having any suitable corner frequency may be used. The preferred embodiment of the pre-demodulation gain and filtering circuit 60 uses multi-stage filters including two bandpass filters and three high pass filters (not shown) to achieve the fifth order high pass and second order low pass filters. However, any suitable combination of filters may be used. Operational amplifiers, resistors and capacitors (not shown) are configured in a known manner to form the filters 61, 62.

The pre-demodulation amplification and filter circuit 60 also includes a gain stage 63 for amplifying the detector output signal 59. The amplifier 63 is preferably a transimpedance amplifier incorporated into one of the bandpass filters in a known manner, although any known signal amplifier may be used.

The pre-demodulation circuit 60 converts the pulsatile detector output current signal 59 into a filtered, amplified pulsatile pre-demodulation voltage signal 64 as shown in FIG. 3. The pre-demodulation signal 64 is sent from the pre-demodulation circuit output 60b to a microcomputer 65. The microcomputer 65 is preferably an 8-pin device, number PIC12C672 manufactured by Microchip Corporation, although any suitable microcomputer may be used.

The microcomputer 65 includes an analog to digital converter 66 which converts the analog pre-demodulation voltage pulses 64 to digital form for further processing by the microcomputer 65. The analog to digital converter 66 is preferably an 8-bit converter having a resolution a approximately 20 mV, although any suitable analog to digital converter having any suitable resolution may be used.

The digital signal is then demodulated in a demodulation stage 68 which demodulates the pulsatile signal to form a dc voltage signal 69 having an amplitude which represents the moisture detected by the sensor. Software within the microcomputer samples the sensed signal twice in rapid succession, once during the moisture sensing portion M of the signal interval I when the moisture sensing signal and the concomitant ambient light disturbances are present, and once during the light signal portion L of the signal interval I when just the ambient light signal is present. The effects of the ambient light disturbances are linearly subtracted through the software realization of a time-shifted linear differential amplifier, as taught by Teder in U.S. Pat. No. 5,059,877 which is incorporated herein by reference.

The output of the demodulation stage 68 is connected to the input 70a of a Digital Signal Processing (DSP) filter stage 70. The DSP filter stage 70 includes a Low Pass Filter 72 and a Bandpass Filter 74. The DSP stage output 70b is connected to a moisture event detection stage 76 which uses event detection software, preferably taught by Teder in U.S. Pat. No. 5,568,027 which is incorporated herein by reference, to produce an output signal at 78 that indicates the presence of moisture on the glass surface.

The output signal 78 of the moisture event detection stage 76 is connected to a moisture removal controller 80, which is preferably a vehicle wiper control unit. The vehicle wiper control unit includes a microcomputer capable of using the moisture event detection signals to control the windshield wipers in response to moisture present on the glass.

The high pre-demodulation gain and wide band filtering of the pre-demodulation stage of the moisture sensor creates a large amount of broadband white noise in the signal. Most of the noise is caused by random recombination of electrons and holes in the photodiodes. Such noise is inherent in the device. The photodiodes of other moisture sensors also generate broadband noise, but those moisture sensors did not have broadband high gain amplifiers. The amount of noise passed through the pre-demodulation stage is directly proportional to the bandwidth of the system. Because the bandwidth of the prior-art systems is low, the white noise content of the system is very low.

In contrast, the present invention amplifies a bandwidth of hundreds of kilohertz to pass the harmonics of the pulsed signal which also carry useful moisture signal information. This causes much of the white noise from the photodiode to be amplified as well. The resulting noise level is quite significant since peak variations of the noise can be higher in amplitude than the effects of the smallest raindrops to be sensed. The present invention is able to extract the sensed rain signals out of the noise using a post-demodulation DSP filtering technique.

Figure 4:
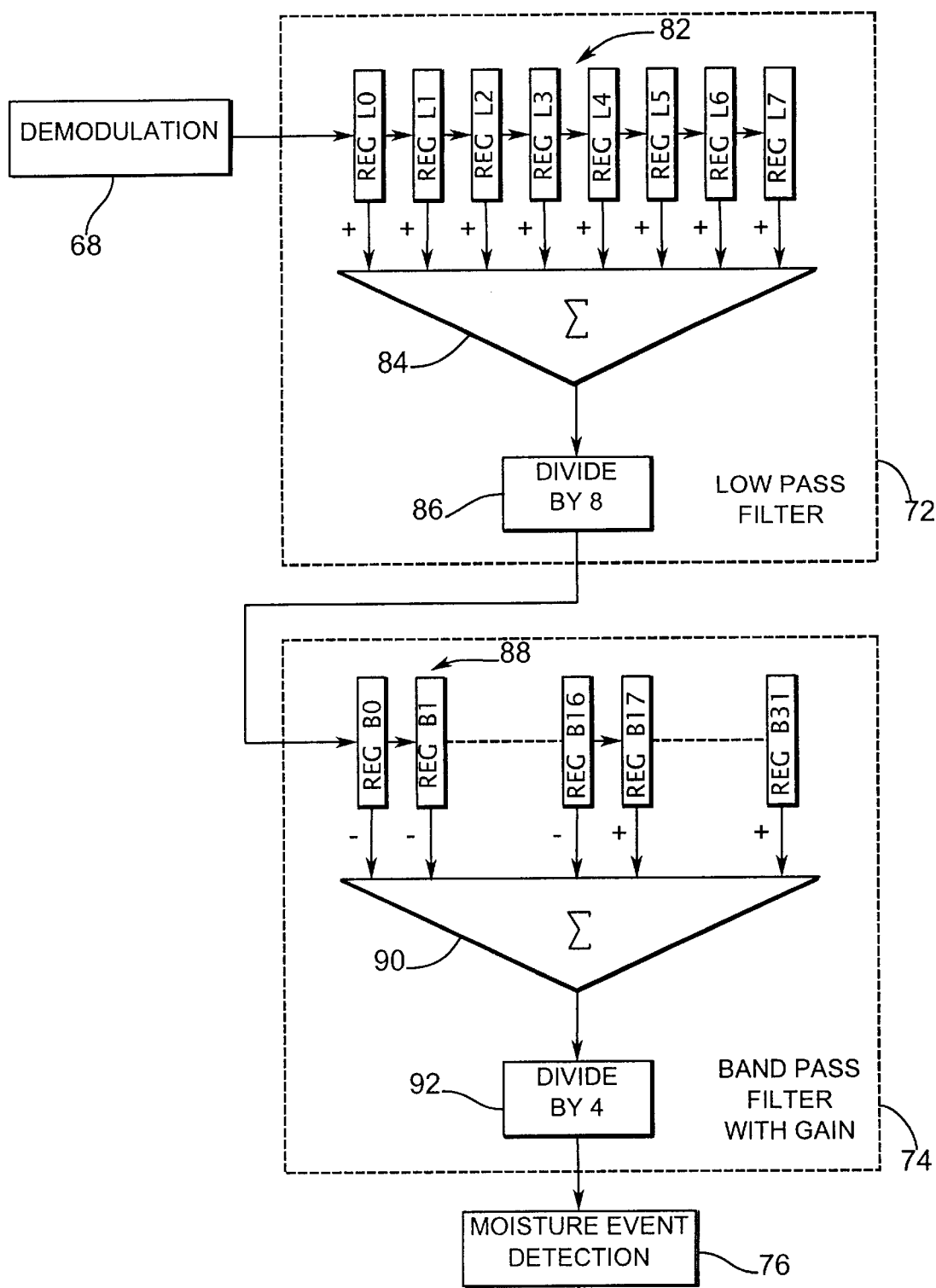
FIG. 4 is block diagram of the Digital Signal Processing filtering implemented by the microcomputer in accordance with the invention.

Referring now to FIG. 4, a block diagram is shown illustrating the algorithm of the DSP filter stage 70 implemented by the microcomputer 65. The low pass filter section 72 is implemented using a First-In First-Out (hereinafter FIFO) shift register 82 within the microcomputer 65 which is known in the art. The shift register 82 includes eight registers labeled REG L0 through REG L7. The first register REG L0 is connected to receive the output of the pre-demodulation stage 68. The LPF stage 72 also includes a summing element 84 within the microcomputer 65 which is known in the art for summing the values contained in all eight registers L0–L7. The output of the summing element 84 is connected to a known division element 86 implemented by the microcomputer 65 which divides the sum by eight, thereby generating the output value of the LPF.

The output of the LPF stage 72 is connected to the input of the BPF stage 74. The BPF filter stage 74 includes a FIFO shift register 88 within the microcomputer 65. The BPF shift register includes 32 registers labeled REG B0 through REG B31. The first register REG B0 is connected to receive the output value of the LPF stage 72. The BPF stage 74 also includes a summing element 90, implemented by the microcomputer 65 which is known in the art, for summing the values contained in the 32 registers B0–B31 as described below. The output of the summing element 90 is connected to a known division element 92 within the microcomputer 65 which divides the sum by 4, generating the output value of the BPF.

The operation of the DSP filter stage 70 shall now be described. The microcomputer preferably operates on a repeating clock signal which corresponds to the 1200 Hz gate pulses described above. The 1200 Hz clock signal defines the typical program instruction cycle, which preferably has the same duration of approximately 833 microseconds as the signal interval I described above. However, any suitable instruction cycle time may be used.

Once each instruction cycle, the digital value representing the demodulated dc output signal is input into the first register L0 of the LPF shift register 82. The previous signal values in the registers L0 through L7 are shifted to the next successive register once each program cycle. For example, the previous demodulation signal value stored in the first register L0 is loaded into the second register REG L1, the value in the second is loaded into the third register REG L2, etc., and the value of the last register REG L7 is discarded.

The values of all eight LPF FIFO registers L0–L7 are summed by the summing element 84 in a known manner. The summed value is then applied to the division element 86 which divides the sum by eight and generates the output of the LPF 72. The output of the LPF 72 is only used once every n instruction cycles, where n equals the number of registers used in the LPF shift register. In the preferred embodiment, the summing element 84 and the division element 86 are only required to be implemented once every 8 instruction cycles because the LPF output is used only every 8 instruction cycles. However, the summing element 84 and the division element 86 may be implemented each program cycle if desired.

Thus configured, the LPF takes an ongoing average of the prior eight samples of the demodulated moisture signal. Averaging has the natural effect of removing rapid fluctuations in the demodulation signal thereby removing the high frequencies to form the Low Pass Filter.

Once every 8 instruction cycles, the LPF output is applied to the first register of the BPF B0. Each register B0–B31 is also shifted once every eight program cycles to make room in the first register to receive the most recent LPF output value. The summing element 90 adds together the oldest sixteen samples contained in registers B16–B31, and subtracts off the sixteen most recent samples contained in B0–B15. It might be said that the BPF takes an average of the oldest samples, and subtracts off an average of the more recent samples. As was the case with the LPF, the effect of rapid variations of the signal is reduced thereby implementing a second low pass filter.

Also, steady state values input to the BPF will be canceled out completely because the average of the old steady state values will equal the average of recent steady state values. In a similar fashion, the very low frequency signal fluctuations will be attenuated. Thus, the blocks of the BPF tend to reject both high and low frequencies, acting as a Bandpass Filter as prescribed.

The BPF division element 92 block divides the output of the summing block by four. Because sixteen samples were involved in each average calculation due to the positive and negative summation, the division element effectively increases the gain of the BPF stage by four. This software gain increases the level of the desired signal, without inducing quantization problems, and helps to pull the desired signal out of the noise floor.

Each of the registers of each FIFO need only be a single eight-bit word. Only the intermediary summation need be preserved as a 16 bit quantity. After the final divide block 92, the result is once again eight bits.

Figure 5:
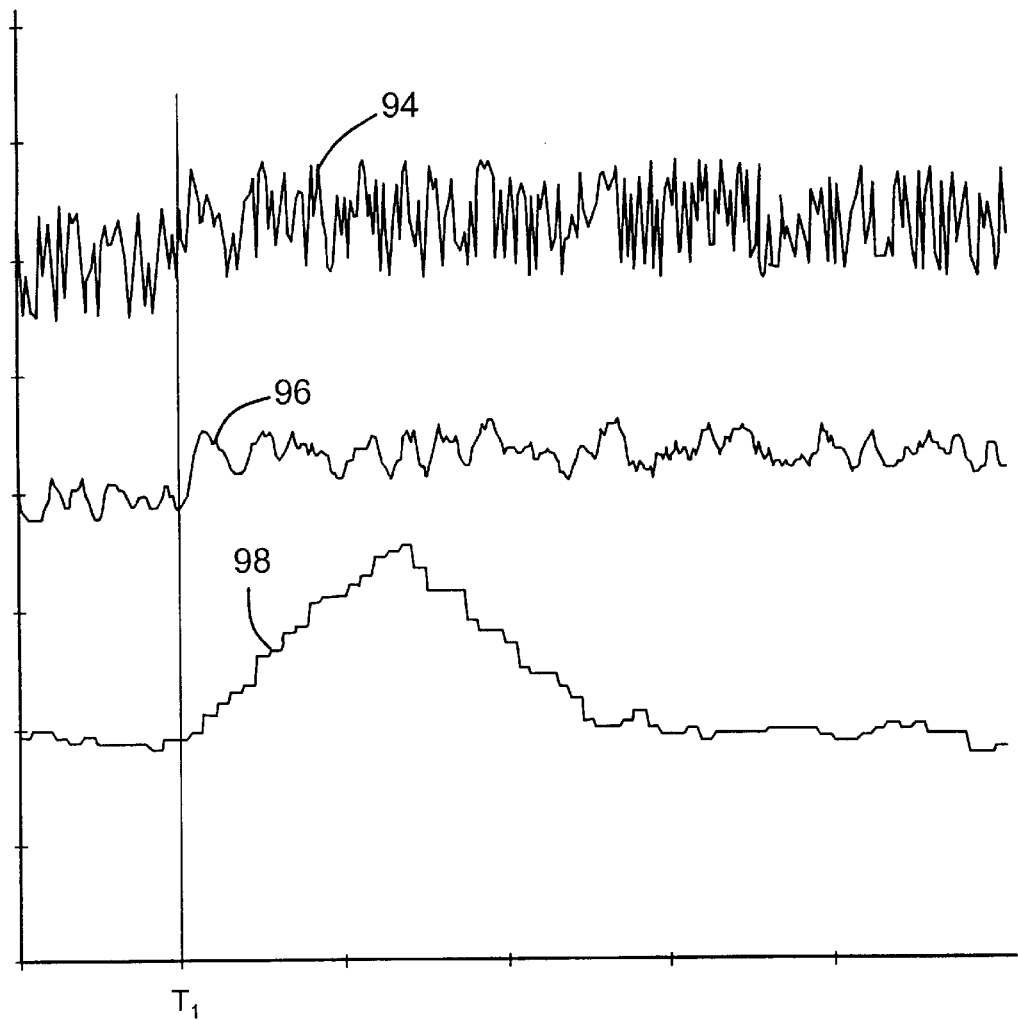
FIG. 5 is a graph of the moisture sensor signals illustrating the effects of the Digital Signal Processing filtering in accordance with the invention.

Referring now to FIG. 5, a graph is shown illustrating the effects of the DSP filtering. The top line of the graph shows a signal 94 representative of that produced by the demodulation stage 68. The demodulation signal 94 includes a randomly distributed noise component as described above that varies between plus and minus 10 counts. At a time $T_1$ one hundred samples into the graph, a step function of 8 counts is introduced to the signal 94. The step response is comparable to a moisture event resulting from a very small raindrop falling onto one of the sensing regions 23. The step function is difficult to discern due to the presence of the noise having a higher magnitude than the noise of plus and minus 10 counts. Under such conditions, it is not easy to select a single threshold level for discerning the presence of a moisture event.

The second line of the graph depicts the output signal 96 of the low pass filter 72. The ongoing average of eight samples considerably reduces the effect of the high frequency variations present in the demodulation signal 94. The presence of the step function, while sill somewhat blurred by noise, is more readily present. The third line of the graph depicts the output signal 98 of the BPF 74. The additional averaging, of thirty-two samples in all, has reduced the effects of the noise still further, to a manageable level. The low-frequency rejecting nature of the filter has converted the step function into triangularly shaped pulse. The software gain has increased the amplitude of the step function. As a result, the effects of the moisture event are clearly discernible. Simple threshold detection may be used on the BPF output to detect the presence of the raindrop.

Examination of the figure reveals that the effects of the DSP algorithm are very apparent. In the original signal, it would be difficult for even a human to examine the signal and see the presence of the rain event. After the DSP, the effects of the raindrop are clear, and the noise is completely manageable. A reason that the DSP discerns the signal so effectively is that it considers the effects of 256 input data points in every point that is outputted. Any single pulse from the emitters can get lost in the noise after the optical path, the noise of the photodiodes, the effects of the sun, and noise present in the gain stage. By combining the information from 256 points, however, the desired signal becomes clear. Another reason for the excellent performance of the DSP algorithm is that it is such high order. The DSP algorithm is in effect a fortieth order filter. Such a filter would be utterly impractical using conventional analog techniques.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A moisture sensor for detecting moisture on the surface of a transparent material and controlling the actuation of a moisture removal system accordingly, said moisture sensor comprising:

an emitter for generating a pulsatile emitter signal which is influenced by the presence of moisture on the surface of the transparent material;

a detector for receiving said pulsatile emitter signal and contributing to the production of a pulsatile detector output signal;

a pre-demodulation circuit operatively connected to said detector and including an input for receiving said pulsatile detector output signal and an output for providing a pulsatile pre-demodulation signal, said pre-demodulation circuit further including a filter and an amplifier;

a demodulation circuit for converting said pulsatile pre-demodulation signal to a dc signal having fluctuating noise components;

a digital signal processing filter stage for filtering said fluctuating noise components from said dc signal and producing a filtered dc output.

2. The moisture sensor of claim 1 further including a microcomputer for implementing said digital signal processing filter stage.

3. The moisture sensor defined in claim 1 wherein said digital signal processing filter stage includes a low pass filter.

4. The moisture sensor defined in claim 3 wherein said digital signal processing filter stage includes a band pass filter.

5. The moisture sensor defined in claim 2 wherein said microcomputer includes a predetermined number of registers for storing successive values of said dc output to implement said low pass filter.

6. The moisture sensor defined in claim 5 wherein said microcomputer includes 8 registers for storing 8 successive values of said dc output to implement said low pass filter.

7. The moisture sensor defined in claim 6 wherein said low pass filter includes a summing element implemented by said microcomputer for providing the sum of said stored values.

8. The moisture sensor defined in claim 7 wherein said low pass filter includes a division element implemented by said microcomputer for dividing said sum of said stored values by a predetermined number.

9. The moisture sensor defined in claim 8 wherein said division element divides said sum of said stored values by 8.

10. The moisture sensor defined in claim 2 wherein said microcomputer includes a predetermined number of registers for storing successive input values to implement said bandpass filter stage.

11. The moisture sensor defined in claim 10 wherein said microcomputer includes 32 registers for storing 32 successive input values to implement said bandpass filter stage.

12. The moisture sensor defined in claim 11 wherein said bandpass filter stage includes a summing element implemented by said microcomputer for summing a first portion of said stored values and subtracting a second portion of said stored values to provide a summing output value.

13. The moisture sensor defined in claim 12 wherein said summing element sums the least recent of said stored values and subtracts the most recent of said stored values.

14. The moisture sensor defined in claim 13 wherein said bandpass filter includes a division element implemented by said microcomputer for dividing said summing output value by a predetermined number.

15. A method for detecting moisture on the surface of a transparent material with a moisture sensor having an emitter and a detector including the steps of:

emitting a pulsatile signal from the emitter which is reflected from the surface of the transparent material wherein the pulsatile signal is affected by the presence of moisture on the transparent material;

detecting the reflected pulsatile signal to produce a pulsatile detection output signal;

amplifying the pulsatile detection output signal;

filtering the pulsatile detection output signal;

demodulating the pulsatile detection output signal to produce a dc signal having a fluctuating noise component;

filtering the dc signal to remove the fluctuating noise component, wherein the filtering includes storing a predetermined number of the dc signal values and summing the predetermined number of dc signal values; and detecting the presence of moisture on the transparent material with the filtered dc signal.

16. The method for detecting moisture on the surface of a transparent material defined in claim 15 wherein the filtering step implements lowpass filtering.

17. The method for detecting moisture on the surface of a transparent material defined in claim 16 wherein the filtering step includes storing the successive 8 dc signal values.

18. The method for detecting moisture on the surface of a transparent material defined in claim 17 wherein the filtering step includes summing the stored predetermined successive number of dc signal values.

19. The method for detecting moisture on the surface of a transparent material defined in claim 18 wherein the filtering step includes dividing the summed dc signal values by a predetermined number to produce a low pass-filtered dc signal.

20. The method for detecting moisture on the surface of a transparent material defined in claim 19 wherein the filtering step includes dividing the summed dc signal values by 8 to produce a low pass-filtered dc signal.

21. The method for detecting moisture on the surface of a transparent material defined in claim 19 wherein the filtering step includes storing a predetermined successive number the low pass-filtered dc signals.

22. The method for detecting moisture on the surface of a transparent material defined in claim 21 wherein the filtering step includes storing the successive 32 low pass-filtered dc signals.

23. The method for detecting moisture on the surface of a transparent material defined in claim 21 wherein the filtering step includes summing a first portion of the stored low pass-filtered signals and subtracting a second portion of the stored low pass-filtered signals to provide a summing output value.

24. The method for detecting moisture on the surface of a transparent material defined in claim 23 wherein the filtering step includes summing the least recent of the stored low pass-filtered signals and subtracting the most recent of the stored low pass-filtered signals to provide a summing output value.

25. The method for detecting moisture on the surface of a transparent material defined in claim 24 wherein the filtering step includes dividing the summing output value by a predetermined number.

26. The method for detecting moisture on the surface of a transparent material defined in claim 25 wherein the filtering step includes dividing the summing output value by 4.

* * * * *